(12) United States Patent
Kim et al.

(10) Patent No.: US 8,948,521 B2
(45) Date of Patent: Feb. 3, 2015

(54) METHOD AND APPARATUS FOR ASSESSING IMAGE QUALITY USING QUANTIZATION CODES

(75) Inventors: Dong-O Kim, Seoul (KR); Rae-Hong Park, Seoul (KR)

(73) Assignee: Industry-University Cooperation Foundation Sogang University, Seoul (KR)

(*) Notice: Subject to any disclaimer, the term of this patent is extended or adjusted under 35 U.S.C. 154(b) by 176 days.

(21) Appl. No.: 13/521,943

(22) PCT Filed: Jan. 11, 2011

(86) PCT No.: PCT/KR2011/000177
§ 371 (c)(1),
(2), (4) Date: Jul. 12, 2012

(87) PCT Pub. No.: WO2011/087251
PCT Pub. Date: Jul. 21, 2011

(65) Prior Publication Data
US 2012/0308145 A1    Dec. 6, 2012

(30) Foreign Application Priority Data
Jan. 12, 2010    (KR) .................. 10-2010-0002890

(51) Int. Cl.
*G06K 9/68* (2006.01)
*G06T 7/00* (2006.01)

(52) U.S. Cl.
CPC ..... *G06T 7/0002* (2013.01); *G06T 2207/30168* (2013.01)
USPC ............................ 382/219; 382/251; 382/275

(58) Field of Classification Search
CPC .................................................. G06K 7/0002
USPC .......................................... 382/275, 219, 217
See application file for complete search history.

(56) References Cited

U.S. PATENT DOCUMENTS 5,974,159 A *  10/1999  Lubin et al. .................. 382/106
8,094,945 B2 *  1/2012  Le Meur et al. .............. 382/199
8,396,323 B2 *  3/2013  Huynh-Thu et al. .......... 382/275

(Continued)

FOREIGN PATENT DOCUMENTS

| | | |
|---|---|---|
| JP | 2009-260940 A | 11/2009 |
| KR | 2007-0049833 A | 5/2007 |
| KR | 2008-0031548 A | 4/2008 |

OTHER PUBLICATIONS

International Search Report for Application No. PCT/KR2011/000177 dated Sep. 27, 2011.

*Primary Examiner* — Samir Ahmed
(74) *Attorney, Agent, or Firm* — Alston & Bird LLP (57) ABSTRACT

Provided is a method for assessing image quality using quantization codes, which includes: filtering an original image and a distorted image; generating phase quantization codes from the filtering result; calculating a Hamming difference between the phase quantization code of the original image and the phase quantization code of the distorted image; and assessing image quality of the distorted image by using the calculated Hamming difference. According to the present disclosure, since pixel values of the original image and the distorted image are mapped onto a quantized complex plane and then binary code operation is performed, it is possible to easily implement image quality assessing hardware and also ensure excellent image quality assessing performance.

15 Claims, 7 Drawing Sheets

(56) References Cited

U.S. PATENT DOCUMENTS

| | | | |
|---|---|---|---|
| 8,422,795 B2* | 4/2013 | Pahalawatta et al. | 382/218 |
| 8,660,364 B2* | 2/2014 | Rezazadeh et al. | 382/199 |
| 2007/0103551 A1 | 5/2007 | Kim et al. | |
| 2009/0103813 A1* | 4/2009 | Le Meur et al. | 382/199 |
| 2010/0265334 A1* | 10/2010 | Bhaskaran et al. | 348/180 |
| 2011/0013694 A1 | 1/2011 | Watanabe | |

\* cited by examiner

| 13 | 24 | 34 | -23 | -54 | -24 | -15 | -15 |
|---|---|---|---|---|---|---|---|
| 5 | -12 | 7 | -10 | -24 | -13 | -30 | -38 |
| -12 | -41 | -21 | -28 | -25 | -4 | -22 | -34 |
| -6 | -36 | -53 | -63 | -48 | -14 | -8 | -28 |
| 4 | -47 | -109 | -114 | -68 | -54 | -67 | -57 |
| 25 | 41 | 45 | -1 | -13 | -92 | -178 | -99 |
| 33 | 123 | 249 | 229 | 117 | -29 | -125 | -86 |
| 14 | 54 | 127 | 67 | -123 | -173 | -57 | -6 |

| 719 | -516 | -332 | 339 | -12 | -142 | -257 | -395 |
|---|---|---|---|---|---|---|---|
| 677 | -480 | -339 | 272 | 10 | -123 | -284 | -376 |
| 612 | -461 | -319 | 228 | 43 | -124 | -318 | -362 |
| 558 | -466 | -311 | 203 | 86 | -112 | -342 | -370 |
| 524 | -513 | -343 | 220 | 130 | -108 | -353 | -369 |
| 495 | -519 | -395 | 221 | 163 | -206 | -354 | -279 |
| 483 | -401 | -383 | 143 | 117 | -385 | -357 | -158 |
| 480 | -268 | -317 | -3 | -39 | -425 | -297 | -128 |

Fig. 3C

| 11 | 10 | 10 | 01 | 00 | 00 | 00 | 00 |
|---|---|---|---|---|---|---|---|
| 11 | 00 | 10 | 01 | 01 | 00 | 00 | 00 |
| 01 | 00 | 00 | 01 | 01 | 00 | 00 | 00 |
| 01 | 00 | 00 | 01 | 01 | 00 | 00 | 00 |
| 11 | 00 | 00 | 01 | 01 | 00 | 00 | 00 |
| 11 | 10 | 10 | 01 | 01 | 00 | 00 | 00 |
| 11 | 10 | 10 | 11 | 11 | 00 | 00 | 00 |
| 11 | 10 | 10 | 10 | 00 | 00 | 00 | 00 |

METHOD AND APPARATUS FOR ASSESSING IMAGE QUALITY USING QUANTIZATION CODES

CROSS-REFERENCE TO RELATED APPLICATION

This application is a national stage application filed under 35 U.S.C. 371 of International Application No. PCT/KR2011/000177, filed Jan. 11, 2011, which claims priority from Korean Patent Application No. 10-2010-0002890, filed Jan. 12, 2010, each of which is incorporated by reference herein in its entirety.

TECHNICAL FIELD

The present disclosure relates to a method and apparatus for assessing image quality using quantization codes, and more particularly, to a method and apparatus for assessing image quality using quantization codes, which maps pixel values of an original image and a distorted image into a quantized complex plane and then performs binary code operation to facilitate easier implementation of an image quality assessing hardware and ensure excellent image quality assessing performance.

BACKGROUND ART

Peak signal-to-noise ratio (PSNR) or mean squared error (MSE) has been frequently used as an objective image quality assessing index when assessing image quality. However, since this image quality assessing index does not easily reflect a subjective image quality of a human, various image quality assessing indexes are being developed. Image quality assessing indexes such as universal quality index (UQI), Structural similarity (SSIM), multi-scale SSIM (MSSSIM), and MSVD have been developed, but these image quality assessing indexes are not easily implemented as hardware and requires a large memory size since they uses floating points when assessing image quality. Therefore, there is needed an image quality assessing technique which may be efficiently implemented as hardware.

DISCLOSURE

Technical Problem

Therefore, the present disclosure is directed to providing a method for assessing image quality using quantization codes, which facilitates easy implementation of image quality assessing hardware and ensures excellent image quality assessing performance.

The present disclosure is also directed to providing an apparatus for assessing image quality using quantization codes, which facilitates easy implementation of image quality assessing hardware and ensures excellent image quality assessing performance.

Technical Solution

In one general aspect, the present disclosure provides a method for assessing image quality using quantization codes, which includes: filtering an original image and a distorted image; generating phase quantization codes from the filtering result; calculating a difference between the phase quantization code of the original image and the phase quantization code of the distorted image; and assessing image quality of the distorted image by using the calculated difference.

According to an embodiment of the present disclosure, the calculating of a difference may calculate a Hamming distance between the phase quantization code of the original image and the phase quantization code of the distorted image, and the assessing of image quality of the distorted image may assess image quality of the distorted image by using the calculated Hamming distance.

In addition, the filtering may convert pixel values of the original image and the distorted image to be mapped with a real part and an imaginary part of a complex plane.

In addition, the generating of phase quantization codes may further include generating amplitude quantization codes from the filtering result, and the calculating of a Hamming distance may calculate a Hamming distance between binary codes composed of amplitude quantization codes and phase quantization codes respectively corresponding to the original image and the distorted image.

In addition, the pixel value may be a luminance value.

According to another embodiment of the present disclosure, the filtering may calculate an x-directional gradient and a y-directional gradient of each pixel of the original image and the distorted image In addition, the filter used in the filtering may be a Gabor filter or a complex wavelet transform filter.

According to still another embodiment of the present disclosure, the assessing of image quality of the distorted image may include: calculating an image quality assessing index by using the calculated Hamming distance; converting the image quality assessing index to be compared with a Differential Mean Opinion Score (DMOS); and assessing image quality of the distorted image according to the similarity between the converted image quality assessing index and the DMOS.

In another general aspect, the present disclosure provides an apparatus for assessing image quality using quantization codes, which includes: a filter unit for filtering an original image and a distorted image; a quantization encoding unit for generating phase quantization codes from the output of the filter unit; a quantization code difference calculating unit for calculating a difference between the phase quantization code of the original image and the phase quantization code of the distorted image; and an image quality assessing unit for assessing image quality of the distorted image by using the calculated difference.

Advantageous Effects

According to the present disclosure, since pixel values of an original image and a distorted image are mapped into a quantized complex plane and then binary code operation is performed, image quality assessing hardware may be easily implemented, and image quality assessing performance is excellent. In addition, according to the present disclosure, in a case where a filter output has a complex value or a pair of values corresponding to a single pixel value, a new image quality assessing index may be generated according to the filter characteristic.

DESCRIPTION OF DRAWINGS

The above and other objects, features and advantages of the present disclosure will become apparent from the following description of certain exemplary embodiments given in conjunction with the accompanying drawings, in which.

BEST MODE

Prior to detailed description of the present disclosure, an outline of technical solutions or an essence of technical aspects of the present disclosure will be presented in advance for better understanding.

An image quality assessing method using quantization codes according to an embodiment of the present disclosure includes filtering an original image and a distorted image, generating phase quantization codes from the filtering result, and calculating a difference between the phase quantization code of the original image and the phase quantization code of the distorted image. After that, by using the calculated difference, image quality of the distorted image is assessed.

[Mode for Invention]

Hereinafter, the present disclosure will be described in more detail based on preferred embodiments. However, these embodiments are for better understanding of the present disclosure, and it is obvious to those skilled in the art that the scope of the present disclosure is not limited thereto. In addition, in a case where detailed description of known functions or configurations in relation to the present disclosure is judged as unnecessarily making the essence of the present disclosure vague, the detailed description will be excluded.

Figure 1:
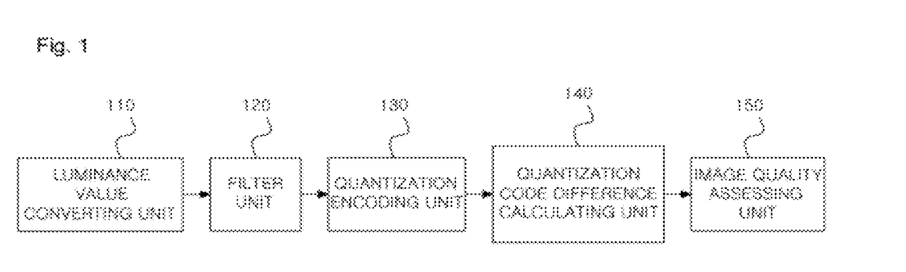
FIG. 1 is a perspective view of a block diagram showing an image quality assessing apparatus using quantization codes according to an embodiment of the present disclosure.

FIG. 1 is a perspective view of a block diagram showing an image quality assessing apparatus using quantization codes according to an embodiment of the present disclosure.

Referring to FIG. 1, an image quality assessing device using quantization codes according to an embodiment of the present disclosure includes a luminance value converting unit 110, a filter unit 120, a quantization encoding unit 130, a quantization code difference calculating unit 140, and an image quality assessing unit 150.

The luminance value converting unit 110 converts a RGB value of an image into a luminance value Y. Conversion into a luminance value may be performed by means of RGB-YCbCr conversion. Preferably, the luminance value converting unit 110 receives an original image and a distorted image and generates luminance values from RGB values of pixels of the original image and the distorted image.

The filter unit 120 receives the luminance value of each pixel output by the luminance value converting unit 110, and generates two values corresponding to each pixel. The filter unit 120 may use a gradient filter, particularly a Sobel operator, and may also use a Gabor filter or a complex wavelet transform filter. In a case where the filter unit 120 is a gradient filter, two values generated by the filter unit 120 may be an x-directional gradient and a y-directional gradient, and in a case where the filter unit 120 is a Gabor filter, a real part specified by a cosine function and an imaginary part specified by a sine function may be two values corresponding to the luminance values, without being limited thereto. Therefore, the filter unit 120 according to an embodiment of the present disclosure preferably includes all kinds of filters which may convert luminance values of each pixel and express them on a complex plane. Hereinafter, the case where the filter unit 120 is a Sobel operator among gradient filters will be particularly discussed.

When I represents an image, gradient values $I_x$ and $I_y$ according to an x axis and a y axis of the image are defined according to Equation 1 below.

$$I_x(x, y) = I(x-1, y-1) + 2I(x-1, y) + I(x-1, y+1) - \quad \text{[Equation 1]}$$
$$\{I(x+1, y-1) + 2I(x+1, y) + I(x+1, y+1)\}$$
$$I_y(x, y) = I(x-1, y-1) + 2I(x, y-1) + I(x+1, y-1) -$$
$$\{I(x-1, y+1) + 2I(x, y+1) + I(x+1, y+1)\}$$

The quantization encoding unit 130 maps two values output by the filter unit 120 onto a complex plane and generates quantization codes from the mapping result. The complex plane is preferably quantized with respect to amplitude and phase. The quantization encoding unit 130 maps the values output by the filter unit 120 onto the complex plane and encodes the values with respect to amplitude and phase. The quantization encoding unit 130 will be described later in more detail with reference to FIGS. 2 and 3A-3F.

The quantization code difference calculating unit 140 compares quantization codes of the original image and the distorted image with each other and calculates a difference between the codes. The difference between the codes may be obtained by calculating a Hamming distance, without being limited thereto.

The image quality assessing unit 150 generates an image quality assessing index based on the calculated difference.

The present disclosure is based on the fact that a structural distortion of an image causes a phase change of the image. Therefore, a structural distortion may also be measured by measuring a phase change of an image. However, in comparison to the case of using only a phase, more excellent performance will be ensured if both amplitude and phase are used.

Figure 2:
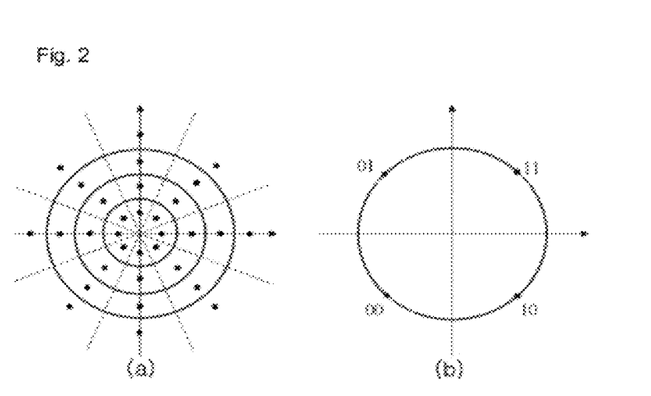
FIG. 2 is a schematic diagram for illustrating quantized complex plane quantization with K number of amplitude levels and L number of phase levels.

FIG. 2 is a schematic diagram for illustrating quantized complex plane quantization with K number of amplitude levels and L number of phase levels.

A portion (a) of FIG. 2 shows amplitude and phase quantization in a case where K=4 and L=8, and a portion (b) of FIG. 2 shows amplitude and phase quantization in a case where K=1 and L=4.

Referring to the portion (a) of FIG. 2, in order to express an amplitude/phase quantization code (APQC), quantization is performed with 4 amplitudes and 8 phases. If K=4, 2 bits are required for encoding, and if L=8, 3 bits are required. Therefore, 5 bits will be required in total for quantization encoding.

Referring to the portion (b) of FIG. 2, the amplitude is not quantized, but only 4 phases are quantized. The case where only 4 phases are quantized will be particularly called a phase quantization code (PQC). Hereinafter, the present disclosure will be based on a gradient filter, but the present disclosure will be applied similarly to another kind of filter.

In the gradient filter, $I_x$ and $I_y$ correspond to a real part and an imaginary part at a complex plane, respectively. Referring to the portion (b) of FIG. 2, if the output value $I_x$ of the gradient has a positive value and $I_y$ has a negative value, the phase quantization codes will be a binary code of [1 0]. In other words, phase quantization codes may be easily calculated by using only signs of the real part and the imaginary part of the output value of the filter unit 120. In addition, if both the real part and the imaginary part of the output value of the filter unit 120 have positive values, it may be checked that the phase quantization code is [1 1].

Since the phase quantization code may be calculated for each pixel present in an image as described above, a phase quantization code of an image is expressed as a 2 bit code sequence of 2×N bit size. Here, N represents the number of all pixels of the image. If the phase quantization code is used, since an image may be expressed as 2 bit code sequence, binary arithmetic operation may be easily performed among images. In addition, since a memory size required for the phase quantization code is 2 bits per pixel but a memory size of conventional general image quality assessing indexes for measuring a characteristic value expressed by a floating-point number is 1 byte per pixel, it could be understood that the memory size required for the phase quantization code per pixel is reduced.

FIGS. 3A-3F show an example of generating 8×8 block phase quantization codes of a building image.

Figure 3A:
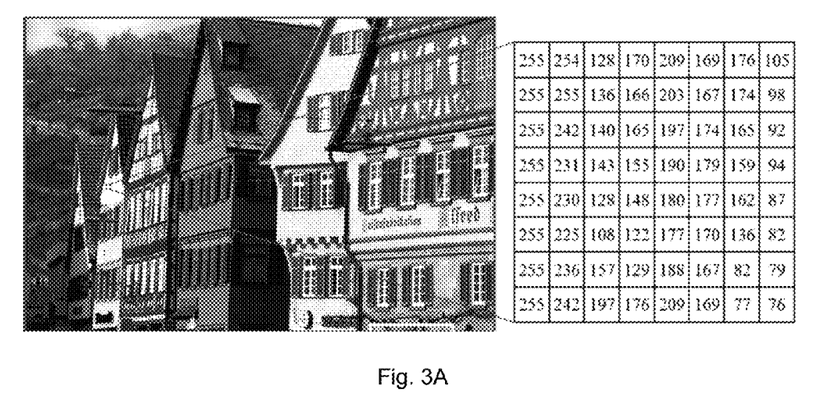
FIGS. 3A-3F are diagrams for illustrating the process of generating 8×8 block phase quantization code of a building image.
Figure 3B:
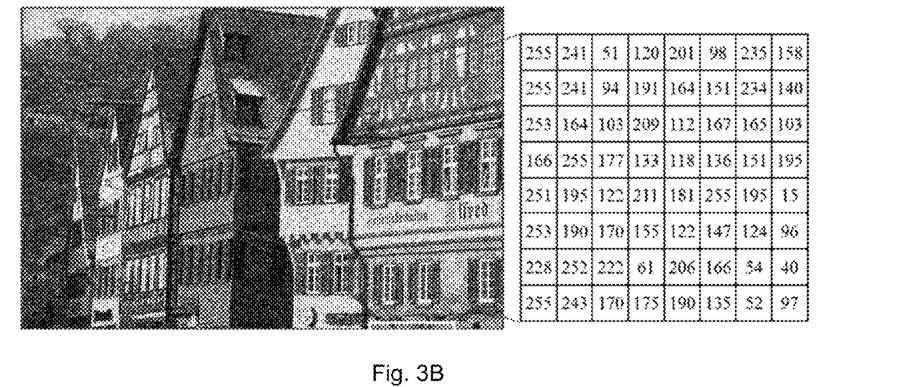
Figure 3C:
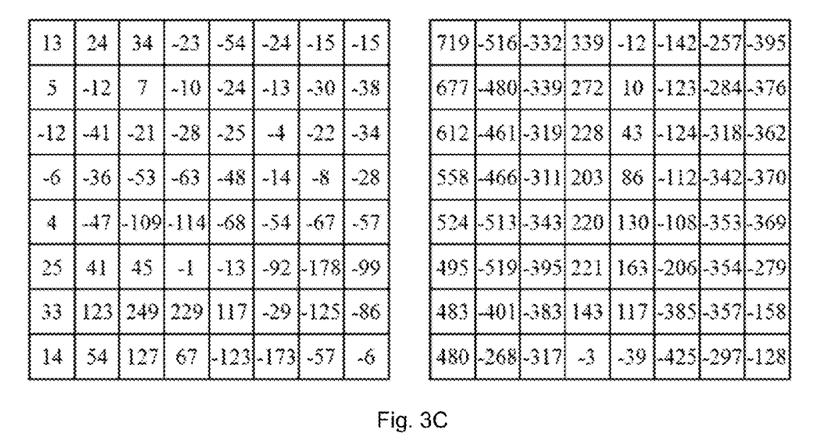
Figure 3D:
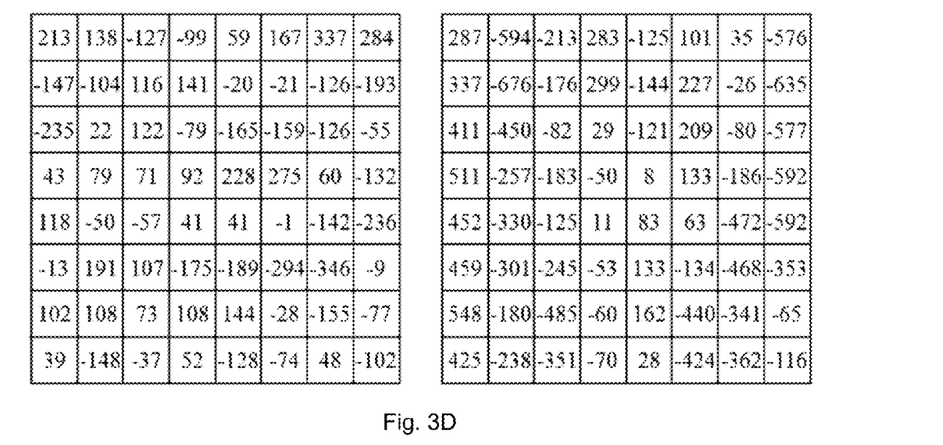
Figure 3E:
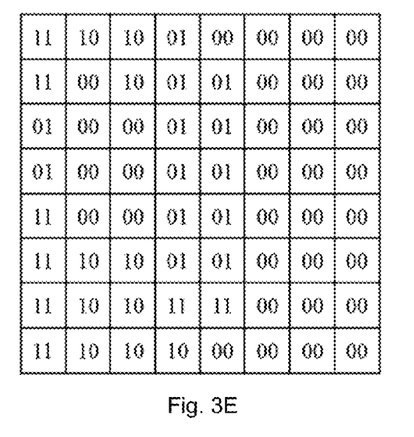
Figure 3F:
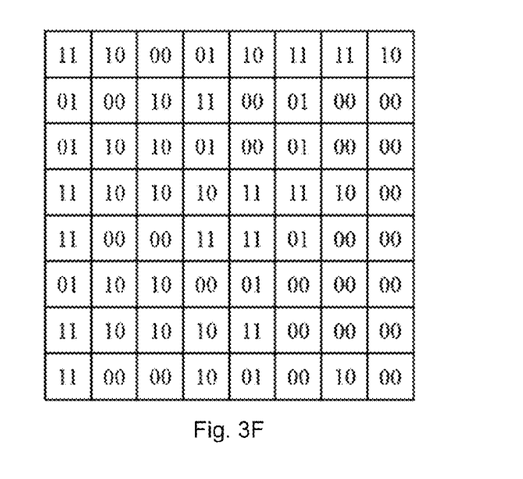

FIG. 3A shows an original image of 8×8 blocks and a resultant luminance value, and FIG. 3B shows an image of enlarged 8×8 blocks, distorted by a white noise, and a resultant luminance value. FIGS. 3C and 3D respectively show gradient values $I_x$ (left) and $I_y$ (right) for the enlarged blocks of FIGS. 3A and 3B. FIGS. 3E and 3F respectively show phase quantization codes (PQC) of FIGS. 3C and 3D. Referring to FIGS. 3A-3F, the process of generating phase quantization codes respectively for the original image and the distorted image may be understood. In other words, binary codes of the original image and the distorted image, which are encoding results of the codes output by the filter, are shown in FIGS. 3E and 3F, and the generated binary codes are used for assessing image quality of the image.

Hereinafter, the quantization code difference calculating unit 140 will be described in more detail.

Generally, most assessing indexes for assessing image quality measure a difference between characteristic values of the original image and the distorted image. However, in substantial cases, a visible difference is as important as the difference in characteristic values when evaluating the image quality. In this point of view, a difference between phase quantization codes of characteristic values of two images may be easily obtained when two subject images are different from each other. Therefore, if a difference between phase quantization codes of the values of the original image and the distorted image output from the filter is calculated, similar results are obtained in comparison to the case where image quality of two images is assessed.

In order to compare and assess image quality of the phase quantization codes of the original image and the distorted image, in one embodiment of the present disclosure, a Hamming distance is used. The Hamming distance is a criterion to represent different bits between two quantization codes. If the image quality deteriorates, the phase quantization code of the image changes. Therefore, a Hamming distance between the phase quantization codes of the original image and the distorted image output by the fitter may well reflect the degree of deterioration of the image. A Hamming distance HD (n) at an $n^{th}$ bit of the phase quantization codes of the original image and the distorted image may be defined according to Equation 2 below.

$$HD(n) = c_r(n) \otimes c_d(n) \qquad \text{[Equation 2]}$$

Here, $c_r$ and $c_d$ represents phase quantization codes of the original image and the distorted image, respectively, and $\otimes$ represents an exclusive OR. In a case of using amplitude/phase quantization codes instead of the phase quantization codes, the Hamming distance may be calculated similarly.

Hereinafter, the image quality assessing unit 150 will be described in more detail.

An image quality assessing index (image quality measurement, IQM) based on phase quantization codes, which is used by the image quality assessing device using quantization codes according to an embodiment of the present disclosure, may be calculated as follows.

$$IQM = \frac{1}{2N} \sum_{n=1}^{2N} HD(n) \qquad \text{[Equation 3]}$$

Here, 2N represents the number of all bits of the phase quantization code. The image quality assessing index generated by Equation 3 is converted into an image quality assessing index which may be compared with DMOS by beams of logistic regression.

Figure 4:
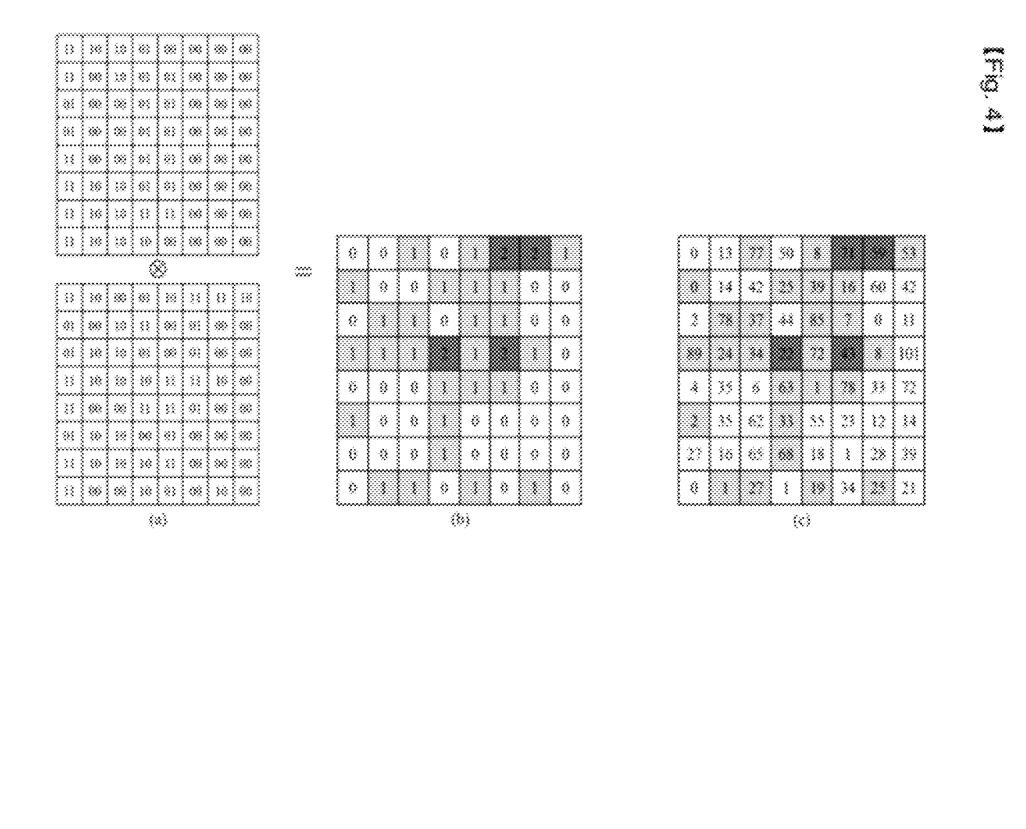
FIG. 4 shows absolute values of differences in a Hamming distance map and a luminance value between an original image and a distorted image.

FIG. 4 shows absolute values of differences in a Hamming distance map and a luminance value between an original image and a distorted image.

A portion (a) of FIG. 4 shows a phase quantization code of a gradient filter output for the original image and the distorted image. A portion (b) of FIG. 4 shows a Hamming distance map between two phase quantization codes shown in the portion (a) of FIG. 4. A portion (c) of FIG. 4 shows an absolute value of a difference in luminance values between the enlarged 8×8 blocks shown in FIGS. 3A and 3B. A brighter region in the portion (c) of FIG. 4 corresponds to a pixel where the Hamming distance HD is 1, and a darker region corresponds to a pixel where the Hamming distance HD is 2.

If the Hamming distance map of a distorted image includes a lot of white region, this means that the original image and the distorted image have no difference, and so the distorted image may be judged as having good image quality.

As shown in the portions (b) and (c) of FIG. 4, the Hamming distance map is not exactly identical to but similar to the absolute difference image. Therefore, in the point that the change of the image causes the change of phase quantization codes, it could be understood that the phase quantization codes well reflect image quality.

Figure 5:
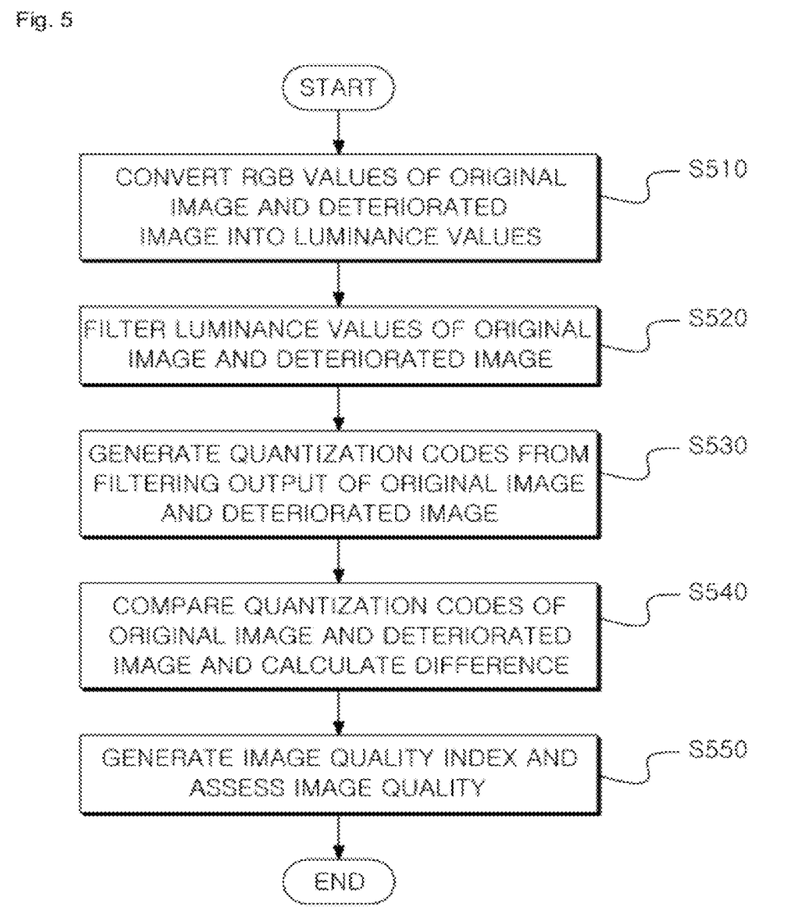
FIG. 5 is a flowchart for illustrating an image quality assessing method using quantization codes according to an embodiment of the present disclosure.

FIG. 5 is a flowchart for illustrating an image quality assessing method using quantization codes according to an embodiment of the present disclosure.

Referring to FIG. 5, the image quality assessing method using quantization codes according to an embodiment of the present disclosure includes time series processes performed by the image quality assessing device using quantization codes, shown in FIG. 1. Therefore, though not described below, the features mentioned above in relation to the image quality assessing device using quantization codes, shown in FIG. 1, will be also applied to the image quality assessing method of this embodiment.

In Operation S510, the image quality assessing device converts RGB values of the original image and the distorted image into luminance values Y.

In Operation S520, the image quality assessing device receives the luminance values of each pixel converted in Operation S510, and performs filtering to generate two values corresponding to each pixel. The filtering may be performed by using a gradient filter, particularly a Sobel operator, and a Gabor filter or complex wavelet transform filter may also be used. In case of the gradient filter, two values generated by filtering may be an x-directional gradient and a y-directional gradient, and in case of the Gabor filter, a real part specified by a cosine function and an imaginary part specified by a sine function may be two values corresponding to the luminance values. Therefore, the filtering according to an embodiment of the present disclosure preferably includes all kinds of filters which may convert luminance values of each pixel and express them on a complex plane.

In Operation S530, the image quality assessing device maps two values filtered in Operation S520 onto a complex plane, and generates quantization codes from the mapping result. The complex plane is preferably quantized with respect to amplitude and phase.

In Operation S540, the image quality assessing device compares quantization codes of the original image and the distorted image and calculates a difference.

In Operation S550, the image quality assessing device generates an image quality assessing index based on the calculated difference and assesses image quality.

Figure 6:
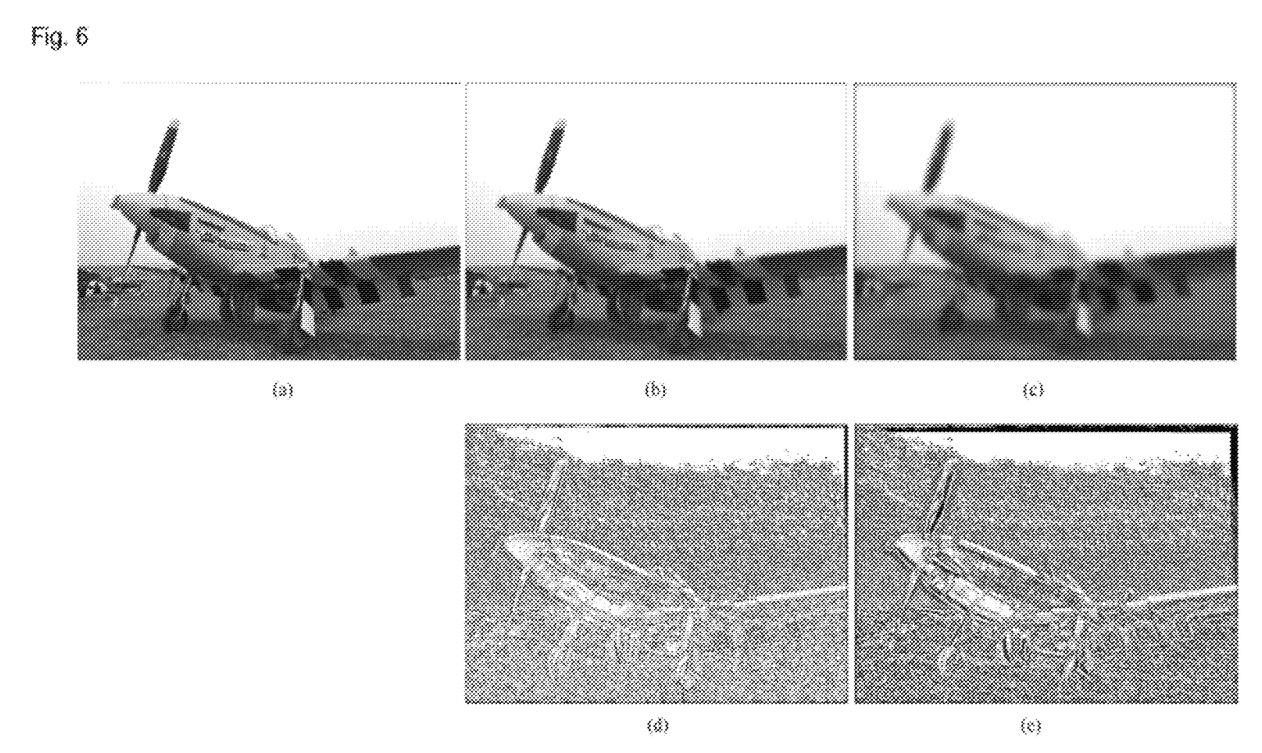
FIG. 6 shows an original image, a distorted image, and a Hamming distance map obtained by phase quantization codes according to an embodiment of the present disclosure.

FIG. 6 shows an original image, a distorted image, and a Hamming distance map obtained by phase quantization codes according to an embodiment of the present disclosure.

A portion (a) of FIG. 6 shows the original image, portions (b) and (c) of FIG. 6 show images distorted by Gaussian blur with a standard deviation of 1.708 and 4.916, respectively. Portions (d) and (e) of FIG. 6 respectively show Hamming distance maps of the portions (b) and (c) of FIG. 6 generated by the phase quantization codes according to an embodiment of the present disclosure. In the portions (d) and (e) of FIG. 6, a white region, a gray region and a black region respectively represent Hamming distance values of 0, 1 and 2.

Therefore, if the Hamming distance map of the distorted image has a lot of white region, this means that the image has good image quality. The distorted image shown in the portion (c) of FIG. 6 is distorted more than the distorted image shown in the portion (b) of FIG. 6. Referring to the portions (d) and (e) of FIG. 6, it could be found that the Hamming distance map of the portion (e) of FIG. 6 has more black region than the Hamming distance map of the portion (d) of FIG. 6, and so it could be understood that the image of the portion (c) of FIG. 6 is more distorted than the image of the portion (b) of FIG. 6. From this result, it could be understood that the image quality assessing method using quantization codes according to an embodiment of the present disclosure well reflects visual deterioration.

In order to assess the performance of the image quality assessing method using quantization codes according to an embodiment of the present disclosure, a Laboratory for Image & Video Engineering (LIVE) data set will be used. The LIVE data set includes 29 original images, 982 distorted images and Differential Mean Opinion Score (DMSO) values. Generally, distorted images of a 768×512 image size are been distorted due to transmission errors at JPEG, JPEG2000, white noise, Gaussian blur, and JPEG2000 bit stream.

An image quality assessing index (IQM) based on phase quantization codes according to an embodiment of the present disclosure, calculated according to Equation 3, may not be instantly used for assessing image quality. In other words, most image quality assessing indexes need to be associated with DMOS which is a subjective image quality assessing index. This is because the purpose of the image quality assessment is to express subjective image quality in a quantitative way.

For this purpose, a DMOS-comparing image quality assessing index to be compared with DMOS should be generated using logistic regression and is expressed like Equation 4 below.

$$DMOS\text{-comparing } IQM = \frac{a_1}{1 + e^{(-a_2 \times IQM - a_3)}} + a_4 \times IQM + a_5 \quad \text{[Equation 4]}$$

Here, $a_1, a_2, a_3, a_4$, and $a_5$ represent constants obtained after the logistic regression.

In order to assess the performance of the DMOS-comparing image quality assessing index obtained after the image quality assessing index is fit by means of the logistic regression, the result fit by the logistic regression is compared with DMOS which is a subjective image quality assessing index. This performance comparison may be performed using a Pearson correlation coefficient, Root Mean Squared Error (RMSE), or Spearman rank order CC (SROCC).

Figure 7:
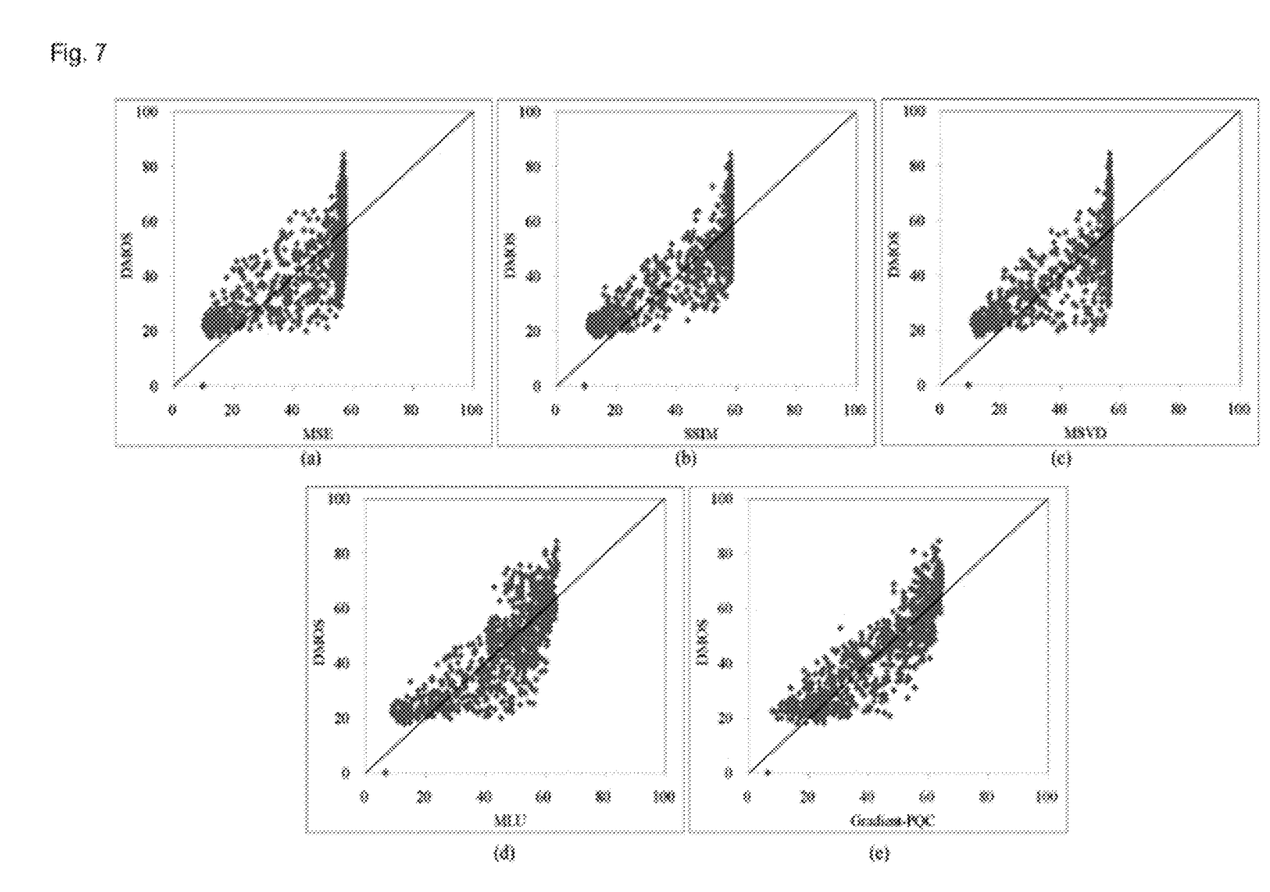
FIG. 7 is a graph where a DMOS value is fit with five kinds of image quality assessing indexes.

FIG. 7 is a graph where the DMOS value is fit with five kinds of image quality assessing indexes. If an image quality assessing index is similar to a diagonal line, the image quality assessing index means as being similar to the DMOS. Therefore, as shown in FIG. 7, it can be understood that the image quality assessing index based on phase quantization codes (Gradient-PQC) using a gradient filter is similar to the DMOS more than other image quality assessing indexes.

Table 1 shows performance assessment results of image quality assessing indexes for the LIVE data set by using a Pearson correlation coefficient. Referring to Table 1, it could be understood that the Gradient-PQC has the greatest Pearson coefficient, and as the Pearson coefficient greater, the similarity to the DMOS is greater.

TABLE 1

|  | JPEG2K | JPEG | WN | GBlur | FF | All data |
|---|---|---|---|---|---|---|
| MSE | 0.908 | 0.913 | 0.893 | 0.863 | 0.875 | 0.887 |
| SSIM | 0.945 | 0.95 | 0.892 | 0.902 | 0.924 | 0.917 |
| MSVD | 0.944 | 0.945 | 0.929 | 0.837 | 0.910 | 0.897 |
| MLU | 0.951 | 0.949 | 0.949 | 0.895 | 0.912 | 0.917 |
| Gradient-PQC | 0.952 | 0.955 | 0.942 | 0.951 | 0.969 | 0.938 |

Table 2 shows performance assessment results of image quality assessing indexes for the LIVE data set by using RMSE. Referring to Table 2, it could be understood that the Gradient-PQC has a smaller RMSE in comparison to other image quality assessing indexes, and as the RMSE is smaller, the similarity to the DMOS is greater.

TABLE 2

|  | JPEG2K | JPEG | WN | GBlur | FF | All data |
|---|---|---|---|---|---|---|
| MSE | 10.781 | 10.097 | 10.592 | 11.482 | 10.754 | 10.714 |
| SSIM | 8.621 | 8.025 | 11.834 | 9.453 | 8.597 | 9.284 |
| MSVD | 9.637 | 8.703 | 8.177 | 14.932 | 9.242 | 10.292 |
| MLU | 8.209 | 7.8022 | 9.590 | 11.716 | 9.580 | 9.276 |
| Gradient-PQC | 8.151 | 7.519 | 8.999 | 9.499 | 5.765 | 8.079 |

Table 3 shows performance assessment results of image quality assessing indexes for the LIVE data set by using SROCC. Referring to Table 3, the Gradient-PQC has a great SROCC as a whole in comparison to other image quality assessing indexes. Particularly, the Gradient-PQC shows the most excellent performance with respect to Gaussian blur and fast fading distortion. However, the MSVD shows the most excellent performance with respect to JPEG2000 and white noise, and the SSIM is most excellent with respect to JPEG.

TABLE 3

|  | JPEG2K | JPEG | WN | GBlur | FF | All data |
|---|---|---|---|---|---|---|
| MSE | 0.941 | 0.928 | 0.970 | 0.845 | 0.921 | 0.897 |
| SSIM | 0.972 | 0.959 | 0.979 | 0.939 | 0.966 | 0.926 |
| MSVD | 0.978 | 0.945 | 0.988 | 0.885 | 0.958 | 0.918 |
| MLU | 0.965 | 0.945 | 0.955 | 0.893 | 0.934 | 0.909 |
| Gradient-PQC | 0.952 | 0.938 | 0.950 | 0.976 | 0.975 | 0.938 |

Table 4 shows the performance comparison results between the amplitude/phase quantization codes (APQC) and the phase quantization codes (PQC) in a case where a gradient filter is used. The GPQC represents PQC using a gradient filter, and the GAPQC represents APQC using a gradient filter. In addition, K represents the number of quantized amplitudes, and Th represents threshold amplitude. In the gradient filter, the amplitude is defined as a root of a value obtained by adding the square of $I_x$ and the square of $I_y$, which are respectively gradient values according to an x axis and a y axis.

Referring to Table 4, it could be understood that the APQC where both amplitude and phase are quantized has more excellent performance than PQC where only a phase is amplitude, and it could also be understood that the performance is further enhanced as the amplitude quantization levels are classified more.

In a case where quantization is performed with four phases to express a single pixel with a binary code, the PQC consumes 2 bits as shown in the portion (b) of FIG. 2. In addition, in the case of the APQC, 3 bits will be consumed if quantization is performed with two amplitudes and four phases, and 4 bits will be consumed if quantization is performed with four amplitudes and four phases.

TABLE 4

|  | JPEG2K | JPEG | WN | GBlur | FF | All data |
|---|---|---|---|---|---|---|
| GPQC (K = 1) | 0.952 | 0.955 | 0.942 | 0.951 | 0.969 | 0.938 |
| GAPQC (K = 2) Th = 128 | 0.968 | 0.968 | 0.946 | 0.954 | 0.966 | 0.953 |
| GAPQC (K = 2) Th = 256 | 0.965 | 0.964 | 0.957 | 0.957 | 0.967 | 0.952 |
| GAPQC (K = 4) (64.128.192) | 0.969 | 0.973 | 0.955 | 0.940 | 0.972 | 0.955 |
| GAPQC (K = 4) (128.256.384) | 0.971 | 0.974 | 0.965 | 0.948 | 0.976 | 0.959 |

The embodiments of the present disclosure may be implemented in the form of program commands executable by various kinds of computers and record on a computer-readable recording medium. The computer-readable recording medium may include program commands, data files, data structures or the like, solely or in combination. The program commands recorded on the medium may be specially designed and configured for the present disclosure or be known to and used by those skilled in the computer software fields. The recording medium includes, for example, magnetic media such as hard disks, floppy disks and magnetic tapes, optical media such as CD-ROM and DVD, magneto-optical media such as floptical disks, and hardware units such as ROM, RAM and flash memories, which are specially configured to store and perform program commands. The program command includes, for example, machine language codes composed by a compiler and high-level language codes executable by a computer by using an interpreter or the like. The hardware unit may be configured to operate as at least one software module in order to perform operations of the present disclosure, or vice versa.

As described above, even though the present disclosure has been presented based on specific limitations such as detailed components as well as limited embodiments and drawings, they are provided just for better understanding of the present disclosure, and the present disclosure is not limited to the embodiments and may be changed or modified in various ways by those having ordinary skill in the art. Therefore, the spirit of the present disclosure should not be limited to the above embodiments, and the appended claims and all equivalents or equivalent modifications thereof should be recognized as being included in the scope of the present disclosure.

The invention claimed is:

1. A method for assessing image quality using quantization codes, comprising:
    filtering luminance values of an original image and luminance values of a distorted image to generate a filtering result;
    generating phase quantization codes from the filtering result;
    calculating a difference between the phase quantization code of the original image and the phase quantization code of the distorted image; and
    assessing image quality of the distorted image by using the calculated difference.

2. The method for assessing image quality using quantization codes according to claim 1,
    wherein said calculating of a difference calculates a Hamming distance between the phase quantization code of the original image and the phase quantization code of the distorted image, and
    wherein said assessing of image quality of the distorted image assesses image quality of the distorted image by using the calculated Hamming distance.

3. The method for assessing image quality using quantization codes according to claim 1, wherein said filtering converts the luminance values of the original image and the luminance values of the distorted image to be mapped with a real part and an imaginary part of a complex plane.

4. The method for assessing image quality using quantization codes according to claim 2,
    wherein said generating of phase quantization codes further includes generating amplitude quantization codes from the filtering result, and
    wherein said calculating of a Hamming distance calculates a Hamming distance between binary codes composed of amplitude quantization codes and phase quantization codes respectively corresponding to the original image and the distorted image.

5. The method for assessing image quality using quantization codes according to claim 1, wherein said filtering calculates an x-directional gradient and a y-directional gradient of each pixel of the original image and the distorted image.

6. The method for assessing image quality using quantization codes according to claim 1, a filter used in said filtering is a Gabor filter or a complex wavelet transform filter.

7. The method for assessing image quality using quantization codes according to claim 2, wherein said assessing of image quality of the distorted image includes:

calculating an image quality assessing index by using the calculated Hamming distance;

converting the image quality assessing index to be compared with a Differential Mean Opinion Score (DMOS); and assessing image quality of the distorted image according to the similarity between the converted image quality assessing index and the DMOS.

8. An apparatus for assessing image quality using quantization codes comprising:

a filter unit for filtering luminance values of an original image and luminance values of a distorted image;

a quantization encoding unit for generating phase quantization codes from the output of the filter unit;

a quantization code difference calculating unit for calculating a difference between the phase quantization code of the original image and the phase quantization code of the distorted image; and an image quality assessing unit for assessing image quality of the distorted image by using the calculated difference.

9. The apparatus for assessing image quality using quantization codes according to claim 8, wherein the quantization code difference calculating unit calculates a Hamming distance between the phase quantization code of the original image and the phase quantization code of the distorted image, and wherein the image quality assessing unit assesses image quality of the distorted image by using the calculated Hamming distance.

10. The apparatus for assessing image quality using quantization codes according to claim 8, wherein the filter unit converts the luminance values of the original image and the luminance values of the distorted image to be mapped with a real part and an imaginary part of a complex plane.

11. The apparatus for assessing image quality using quantization codes according to claim 9, wherein the quantization encoding unit further generates amplitude quantization codes from the output of the filter unit, and wherein the quantization code difference calculating unit calculates a Hamming distance between binary codes composed of amplitude quantization codes and phase quantization codes respectively corresponding to the original image and the distorted image.

12. The apparatus for assessing image quality using quantization codes according to claim 8, wherein the filter unit calculates an x-directional gradient and a y-directional gradient of each pixel of the original image and the distorted image.

13. The apparatus for assessing image quality using quantization codes according to claim 8, wherein the filter unit is a Gabor filter or a complex wavelet transform filter.

14. The apparatus for assessing image quality using quantization codes according to claim 9, wherein the image quality assessing unit calculates an image quality assessing index by using the calculated Hamming distance, converts the image quality assessing index to be compared with a DMOS, and assesses image quality of the distorted image according to the similarity between the converted image quality assessing index and the DMOS.

15. A computer program product comprising at least one non-transitory computer-readable recording medium storing computer-executable instructions that, when executed, cause an apparatus to:

filter luminance values of an original image and luminance values of a distorted image to generate a filtering result;

generate phase quantization codes from the filtering result;

calculate a difference between the phase quantization code of the original image and the phase quantization code of the distorted image; and assess image quality of the distorted image by using the calculated difference.

* * * * *